United States Patent [19]

Kashiyama et al.

[11] Patent Number: 5,001,626
[45] Date of Patent: Mar. 19, 1991

[54] VECTOR PROCESSOR

[75] Inventors: Masamori Kashiyama; Hitoshi Abe, both of Hadano, Japan

[73] Assignee: Hitachi Ltd., Tokyo, Japan

[21] Appl. No.: 512,580

[22] Filed: Apr. 20, 1990

Related U.S. Application Data

[63] Continuation of Ser. No. 230,471, Aug. 9, 1988, abandoned.

[30] Foreign Application Priority Data

Aug. 14, 1987 [JP] Japan .................. 62-201701

[51] Int. Cl.$^5$ .................. G06F 15/347; G06F 9/38
[52] U.S. Cl. .................. 364/200; 364/232.21; 364/231.8
[58] Field of Search ... 364/200 MS File, 900 MS File

[56] References Cited

U.S. PATENT DOCUMENTS

| 4,433,394 | 2/1984 | Torii et al. ............... | 365/221 |
| 4,617,625 | 10/1986 | Nagashima et al. ....... | 364/200 |
| 4,725,973 | 2/1988 | Matsuura et al. .......... | 364/736 |
| 4,755,931 | 7/1988 | Abe . | |

OTHER PUBLICATIONS

IEEE Journal of Solid-State Circuits, SC21, No. 4 of 1986, pp. 501-504.

Primary Examiner—Eddie P. Chan
Attorney, Agent, or Firm—Fay, Sharpe, Beall, Fagan, Minnich & McKee

[57] ABSTRACT

In a vector processor in which a plurality of load/store pipelines from a plurality of arithmetic units and a main storage are used for input/output operations of vector data on a plurality of vector registers in a parallel fashion, vector data is communicated between the respective modules constituting a physically closed system. A sequence of odd-numbered vector data elements and a sequence of even-numbered vector data elements each having a phase difference of a half of a period of a basic machine cycle are communicated at a speed of the basic machine cycle. The module includes vector registers, each vector register is constituted with two RAM arrays being independently addressable and being capable of performing read and write operations at a speed which is twice the basic machine cycle. The two vector data element sequences are converted into a vector data element sequence having a speed which is twice the machine cycle such that the respective vector data elements are alternately written and read in the RAM arrays at a speed which is twice the basic machine cycle. The vector data element sequence thus read out is converted into a sequence of odd-numbered vector data elements and even numbered vector data elements each having a speed of the basic machine cycle and thus the attained vector data element sequences are output.

7 Claims, 7 Drawing Sheets

VECTOR PROCESSOR

This is a continuation of copending application Ser. No. 07/230,471 filed on Aug. 9, 1988, now abandoned.

The present invention relates to a vector processor suitable for implementing a super-high speed machine cycle in a super computer or the like. The invention particularly applies to a vector processor in which vector registers with a plurality of RAM banks can operate at a high speed.

A plurality of pipeline arithmetic units and a plurality of vector registers within a vector processor have been previously used to improve super computer performance. These features permit vector data processing concurrently with other non-vector instructions. The vector data subjected to this parallel processing are communicated between the vector registers and pipeline arithmetic units to speedup the super computer machine cycle.

FIG. 1 shows a schematic diagram of a conventional vector processor comprised of vector register 1 which includes $VR_0$ to $VR_{31}$. The processor also contains high-speed random access memories (RAMs), a selector (SEL) 3 for selecting one of the output vector data signals 5 from the vector register 1 which are supplied to one of the pipeline arithmetic units 6 (namely, arithmetic unit 0, 1, 2, or 3), and a selector (DIST) 2 which includes a switch matrix for selecting one of the output result buses 8 from the pipeline arithmetic units 6. The selected bus 8 connects the arithmetic units to the vector register 1 including $VR_0$ to $VR_{31}$. The vector load pipelines 10 load $VR_0$ to $VR_{31}$ with vector data from main storage (MS) 9 via DIST 2, and vector store pipeline 11 delivers vector data as arithmetic results from $VR_0$ to $VR_{31}$ through SEL 3 to the main storage (MS) 9.

Vector data is read from MS 9 by executing a vector load instruction which indicates a number within the vector register 1. The vector data is supplied to the RAM as a sequence of vector elements. In response to an arithmetic instruction, the vector data is read as an operand from the vector register 1 and is then supplied to the arithmetic pipeline or unit 6 in the vector element order. The instruction allocates a number of the vector register 1 to store the operation result and the operation result is written in the RAM within the vector register 1 denoted by the number. In addition, since a vector arithmetic operation requires repetitious arithmetic operation on the same vector data, a high-speed RAM is employed for the vector register 1. This RAM permits both a read operation of the operand and a store operation of the arithmetic operation result at the clock speed of the machine cycle. This means that in a case where a vector operation is conducted by means of the MS 9, the vector register is adopted as a temporary store buffer during the repetitious processing on the vector data. In the vector processor of FIG. 1, a three-dimensional structure is employed for the logic and RAMs of DIST 2, vector register 1 and SEL 3 to minimize delay time in the machine cycle. This structure places the semiconductor chips on a ceramic substrate in a configuration which reduces the signal transmission distance. Vector processors having such a structure have been described in pages 195 to 209 of the Nikkei Electronics, Dec. 16, 1985, and in pages 237 to 272 of the Nikkei Electronics, Nov. 19, 1984.

In U.S. Pat. No. 4,617,625 a vector processor is described which provides a vector register to execute a vector operation at a high speed. During the repetitious arithmetic operation processing of the vector operation, the vector register stores a vector operation result and supplies an operand in the processing of subsequent instructions in many cases. In this processor an operand read and a result write are simultaneously achieved by configuring the RAM constituting the vector register in a bank arrangement or array. This bank arrangement keeps all vector data elements having an even number in one bank and all vector data elements having an odd number in another bank. The write and read operations on each bank can occur at the clock speed of the machine cycle.

On the other hand, in the prior art of the semiconductor field, an ultrahigh speed RAM having an address access time of sub-nanoseconds (less than 1 nanosecond), like that described in pages 501 to 504 of the IEEE Journal of Solid-State Circuits SC 21, 4 (1986), has also been realized. In addition, there has also been commonly known a method in which a super high speed RAM is contained in a semiconductor chip together with random access logic to accomplish an ultrahigh speed operation in a physically closed system. Moreover, the JP-A-59-77574 has described a method utilizing vector registers configured in a bank.

To implement a high speed machine cycle where vector registers are configured in a two-bank RAM as described above, the vector registers are contained in a module forming a physically closed system to be employed in a vector processor. This physical structure permits a machine cycle having a speed twice that of the conventional system. This speed improvement is possible since impedance mismatching does not occur within the physically closed system. However, at connections between the physically closed system and an other system, impedance mismatching occurs. This impedance mismatching results in signal distortion due to reflection and the like.

High-speed transmission is only possible in a physically closed system such as a semiconductor chip, a module, a package card, or the like where the components possess the same electrical characteristics. In systems not physically closed there arise problems at the connections with the high speed RAM. At these connections the electrical signals are distorted and electrical noise occurs.

SUMMARY OF THE INVENTION

It is therefore an object of the present invention to provide a vector processor in which a vector data transfer rate is shorter than a machine cycle in a module forming a physically closed system. In this system, a signal transmission is achieved at the machine cycle for each vector data at a connection point between physically closed systems and an arithmetic operation can be accomplished at a cycle shorter than the machine cycle.

According to the present invention, the vector data transfer in the module forming a physically closed system is set twice as high as the machine cycle. For example, when the module includes vector registers, two ultraspeed RAMs are configured in a bank arrangement so as to be independently addressed with respect to vector registers logically assigned with the same number. The system is configured so that one bank of the RAMs keeps all even-numbered elements of vector data and that the other bank thereof keeps all odd-numbered elements of vector data. For each bank of RAMs, a write control signal to generate a write address and a read control signal to generate a read address are transmitted at the clock speed of the machine cycle. These signals are produced with a phase difference identical to one half of a period between the write control signal and the read control signal. The write and read operations of the vector data in the one bank occur at a time equal to a half of the write/read cycle with respect to the write and read operation of the vector data in the other bank. The two banks viewed as an entire RAM provide a sequence of vector data elements including even-numbered and odd-numbered vector data elements in an alternate fashion at a clock speed which is twice the speed of the machine cycle. During a write time of an odd-numbered element of the vector data in the one bank of RAMs, an even-numbered element thereof is read from the other bank. Then an odd-numbered subsequent to the even-numbered element previously read out is read from the one bank. In this read time, an even-numbered element subsequent to the odd-numbered element previously written is written in the other bank. Through repetitiously achieving the operations above the read and write operations can be effected at a clock speed which is twice the speed of the machine cycle in the overall RAMs.

The vector data is supplied to the module by two sequences of vector data elements being switched at a clock speed of the machine cycle and having a phase difference identical to a half of the machine cycle between them. In the module, each data element sequence is identified with a first half portion of a signal. The two vector data sequences are converted into successive vector data elements in which odd-numbered and even-numbered vector data element alternately appear at a period which is a half of the machine cycle.

In the RAMs, each vector data element sequence is written at a clock speed which is twice the speed of the machine cycle and each vector data element sequence is read at a clock speed which is twice the speed of the machine cycle. In a case where a vector data element sequence is to be sent from the module to an external device, the vector data element sequence read from the RAMs is converted into an odd-numbered vector data element sequence and an even-numbered vector data element sequence. Each sequence is switched at a clock speed of the machine cycle and having a phase difference equal to a half of the machine cycle, thereby transmitting the resultant two vector data element sequences to the external device.

While transferring the vector data between the module and an external device at a speed which is twice as high as the machine cycle, the present invention also transmits signals which alternately switch pins of the module in the signal communication between the module and the external device. This prevents the loss of electrical stability in the data communication due to the signal distortion or the like caused by an impedance mismatching. Furthermore, an ultrahigh speed RAM can be operated at a speed twice as high as the machine cycle so as to effectively utilize the high-speed operation of the RAM. By communicating vector data between the module and an arithmetic unit, at a speed which is twice the machine cycle, the arithmetic operation occurs at a speed which is twice as high as the machine cycle.

If the odd-numbered and even-numbered vector sequences are not produced within the module, processing the vector data at a clock speed of the machine cycle requires additional hardware. These additions include the amount of wirings and the number of pins of the LSI. System implementation is more difficult and the module logic becomes complicated.

The present invention is also applicable to cases where the vector data is communicated at a speed which is n times as high as the machine cycle, where n is an integer greater than two. In these cases, the module receives n vector data element sequences from the vector data. The n vector data element sequences being attained by sequentially extracting the respective n-th elements transmitted at a speed of the machine cycle and respectively having a phase difference equal to 1/n of the machine cycle. This data configuration permits writing the attained data element sequence in the RAM at a speed which is n times as high as the machine cycle. Furthermore, the module reads the vector element sequence from the RAM at a speed which is n times as high as the machine cycle. The RAM system is here assumed to be configured as a bank array or arrangement in which n super high speed RAMs can be respectively addressed in an independent fashion. Each bank is structured to keep n groups of vector data elements, each arranged with the respective n-th vector elements and is capable of effecting read and write operations at a speed which is n times the machine cycle.

According to the present invention, a vector data signal switching at a high speed which is twice or n times (where n is an integer greater than 2) the machine cycle can be enclosed in a physically restricted location. Additionally, the processing can be accomplished by use of a vector register at a high speed which is twice or n times (where n is an integer greater than 2) the machine cycle.

BRIEF DESCRIPTION OF THE DRAWINGS

These and other objects and advantages of the invention will become apparent by reference to the following description and accompanying drawings wherein.

DESCRIPTION OF THE PREFERRED EMBODIMENTS

Figure 2:
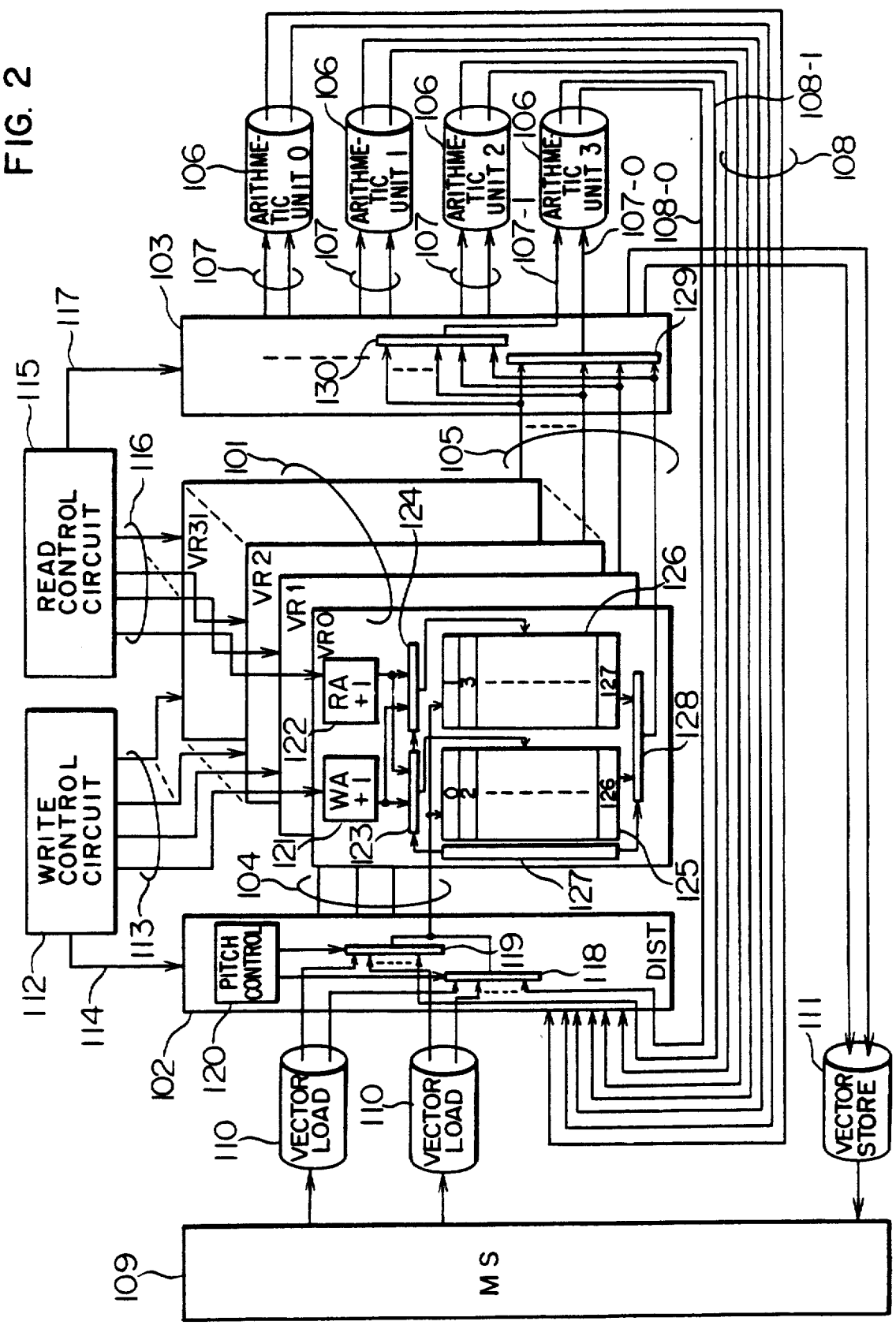
FIG. 2 is a block diagram schematically showing an example of a vector processor according to the present invention.

FIG. 2 shows an overall configuration of a vector processor according to the present invention.

The constitution of FIG. 2 includes vector registers 101 constituted with $VR_0$ to $VR_{31}$, a switch matrix logic (DIST) 102, a switch matrix logic (SEL) 103, pipeline arithmetic units 106, vector load pipelines 110, a vector storage pipeline 111, and a main storage (MS) 109. The vector register 101 includes a bank A RAM 125 keeping even-numbered elements of vector data, a bank B RAM 126 keeping odd-numbered elements of vector data, a WA+1 counter 121 for generating a write address for the two bank RAMS 125 and 126, an RA+1 counter 122 for generating a read address therefor, a selector 123 for the bank A RAM 125 for distributing the addresses generated from the respective counters 121 and 122 at a pitch which is twice the machine cycle by means of a pitch control circuit 127, a selector 124 for the bank B RAM 126 to effect the similar operation as that of the selector 123, and a selector 128 for selecting the data output from the respective banks A and B at a speed which is twice the machine cycle by means of the pitch control circuit 127. In addition, for the vector registers 101, a write control signal 113 from a write control circuit 112 and a read control signal 116 from a read control circuit 115 are supplied to the respective vector registers 101. The relationship between the read and write signals is attained by changing the phase by a half of the cycle with respect to the clock speed of the machine cycle. This permits parallel control of the respective vector registers in the operating state. Details of the vector registers 101 in the present invention will be described later.

The DIST 102 is constituted of a selector 118 for selecting the even-numbered elements of vector data and a selector 119 for selecting the odd-numbered elements. The vector data elements are from operation result output buses 108, 108-0, and 108-1 of the pipeline arithmetic units 106 and from the vector load pipelines 110 which receive vector data stored in the MS 109. The selectors 118 and 119 are configured to operate at a clock speed of the machine cycle having a phase difference of a half of the cycle. Although not shown in FIG. 2, the system includes as many selectors as there are vector registers 101. Here, 32 selectors are disposed so as to be operable in a parallel fashion. In the operation, a selector 118 and a selector 119 respectively correspond to a vector register select signal 114 delivered from the write control circuit 112 and the instruction associated with the pitch selection of the pitch control circuit 120. Elements 118 and 119 select leading half portions, respectively, of even-numbered elements and odd-numbered elements of vector data with a phase difference of a half of the cycle at a clock speed of the machine cycle. The result of an OR operation performed on the outputs from the respective selectors 118 and 119 is fed to a write data bus 104.

The SEL 103 includes a selector 129 for selecting even-numbered elements of the read vector data from the vector registers 101 passing through 32 data buses 105 which are driven at a speed which is twice the machine cycle. This read vector data has an operation speed equal to the clock speed of the machine cycle and a phase difference identical to a half of the cycle. Selector 130 selects the odd-numbered elements of the vector data. A set of selectors 129 and 130 are, although not shown in FIG. 3, also respectively prepared for the output buses 107, 107-0, and 107-1 to the four pipeline arithmetic units 106 and for the vector store pipe line 111 to the MS 109. This bus arrangement permits parallel operation. Vector data from the read data buses of the vector register 101 selected by the vector register select signal 117 are output by a set of selectors 129 and 130. These data are placed on the output buses to the pipeline arithmetic unit 106 indicated by an instruction and the vector store pipeline 111. The even-numbered and odd-numbered elements of the vector data are respectively selected by the selectors 129 and 130 at the clock speed of the machine cycle. For example, the even-numbered and odd-numbered elements are output to the buses 107-0 and 107-1, respectively. In addition, for the function modules such as the pipeline arithmetic units 106, there are also disposed buses associated with the even-numbered and odd-numbered elements of the vector data. For example, for pipeline arithmetic unit 3 there are disposed an even-numbered element input bus 107-0, and odd-numbered element input bus 107-1, and even-numbered element output bus 108-0, and an odd-numbered output bus 108-1. The respective even-numbered and odd-numbered buses are driven at the clock speed of the machine cycle with a phase difference identical to a half of the cycle of the clock speed of the machine cycle. As described above, in each physically closed system of the vector processor, there are disposed means for receiving at a speed of the machine cycle a sequence of even-numbered vector data elements and a sequence of odd-numbered vector data elements. Each sequence has a phase difference identical to a half of the machine cycle. The vector processor also contains means for transmitting vector data from the physically closed system to an external device in a form of two vector data element sequences like those described above.

Figure 1:
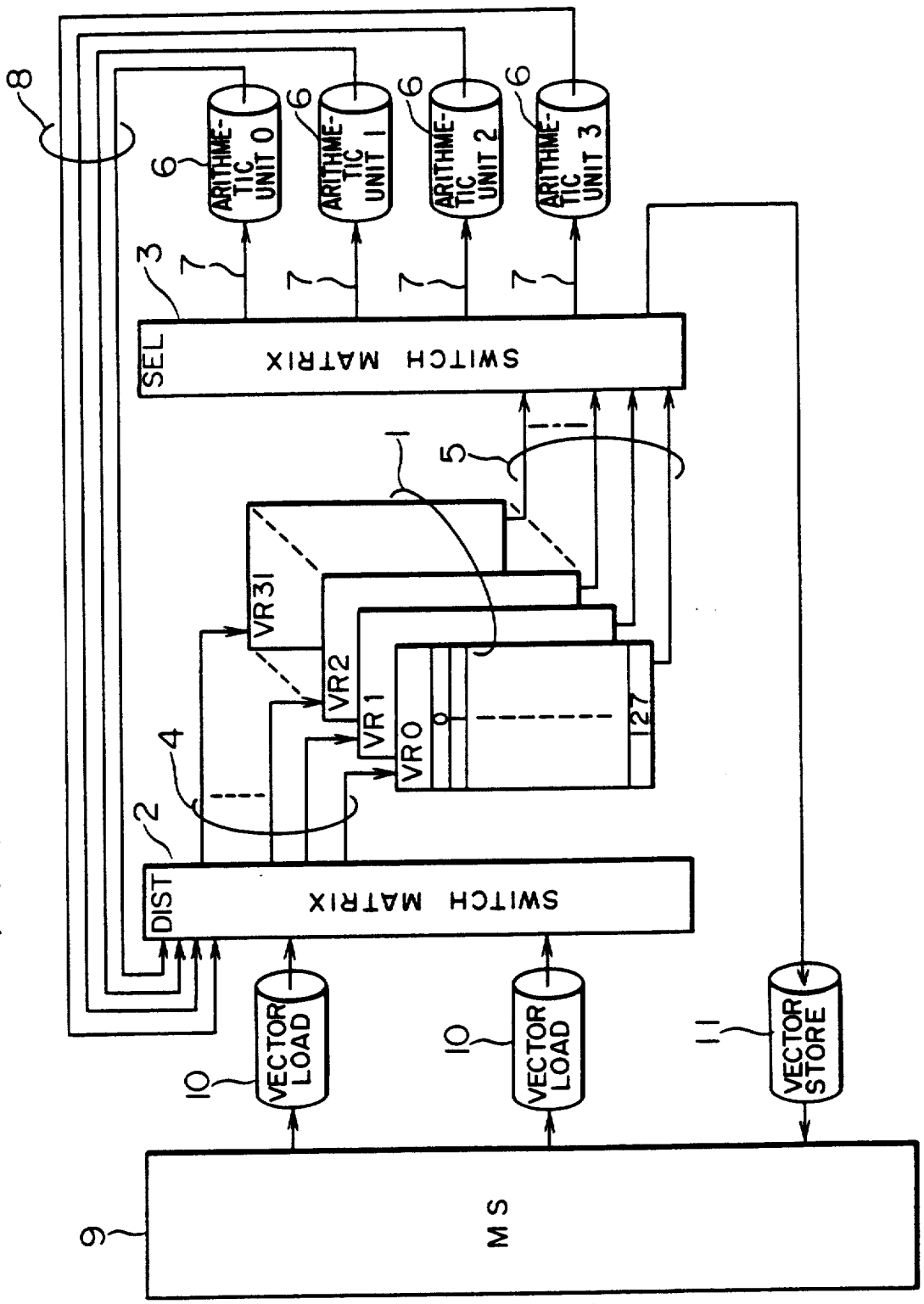
FIG. 1 is a block diagram schematically showing a conventional example of a vector processor.
Figure 3:
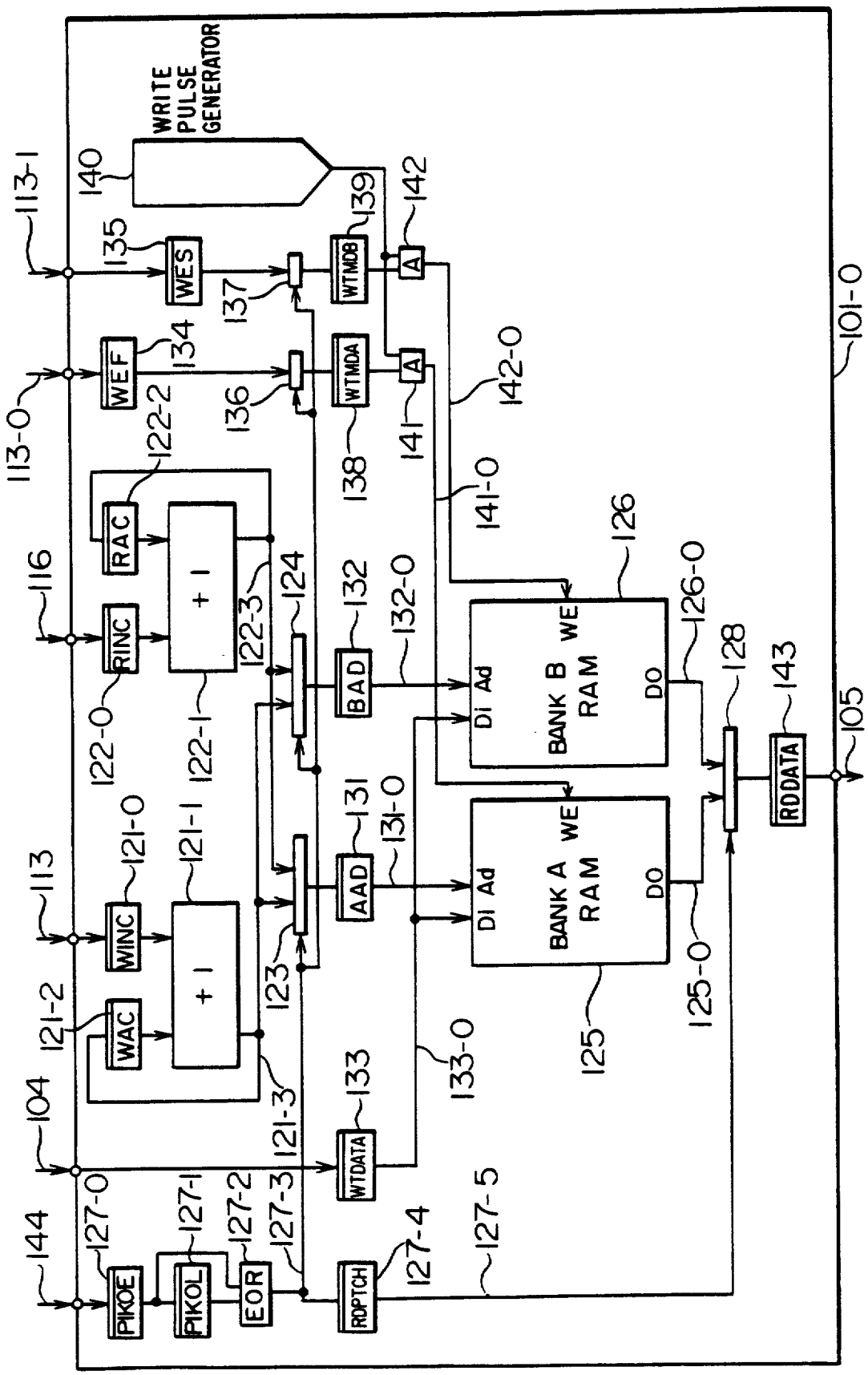
FIG. 3 is a schematic diagram showing in detail vector registers of FIG. 2.
Figure 4:
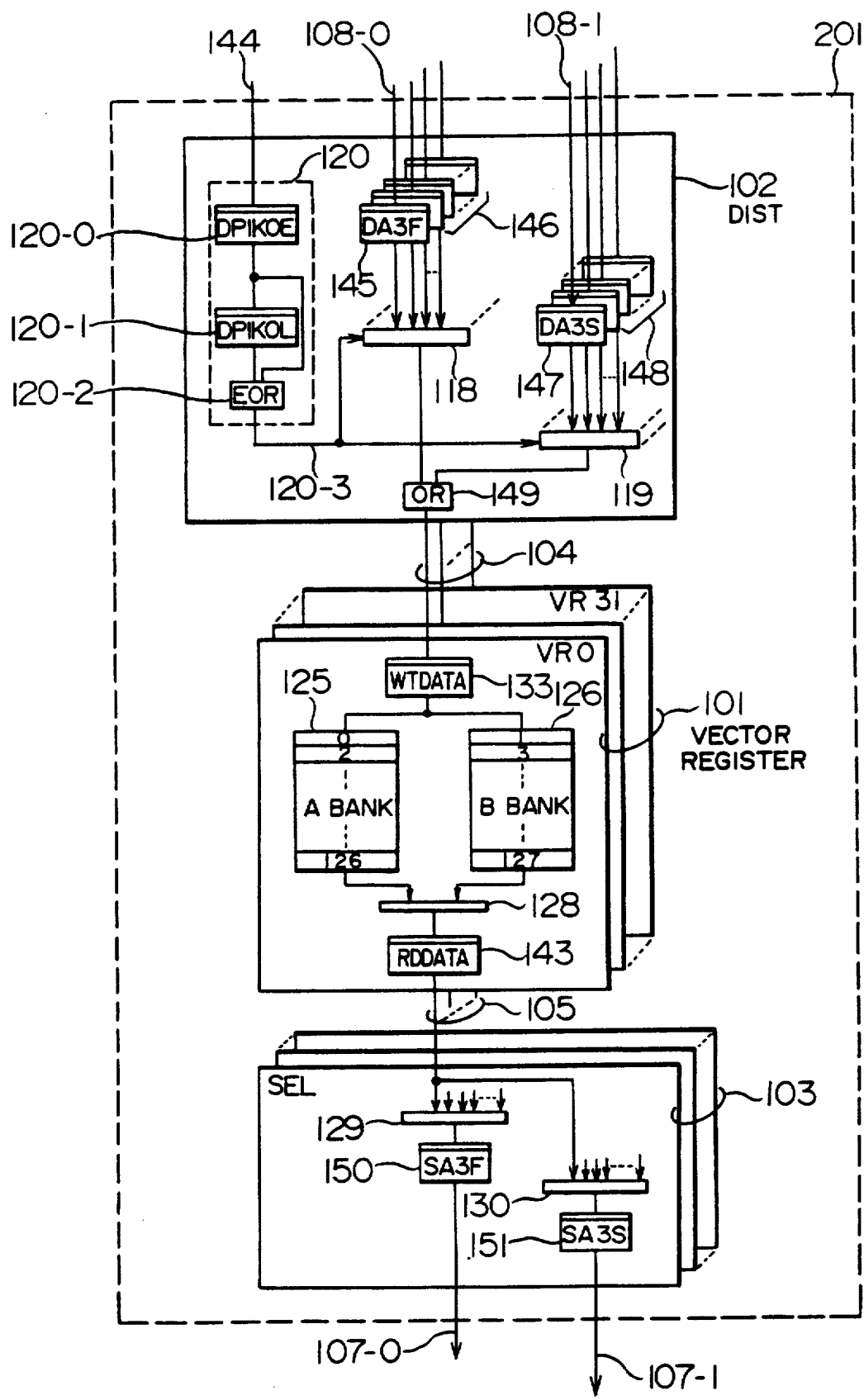
FIG. 4 is a diagram schematically showing a data configuration in, a vector register module.
Figure 6:
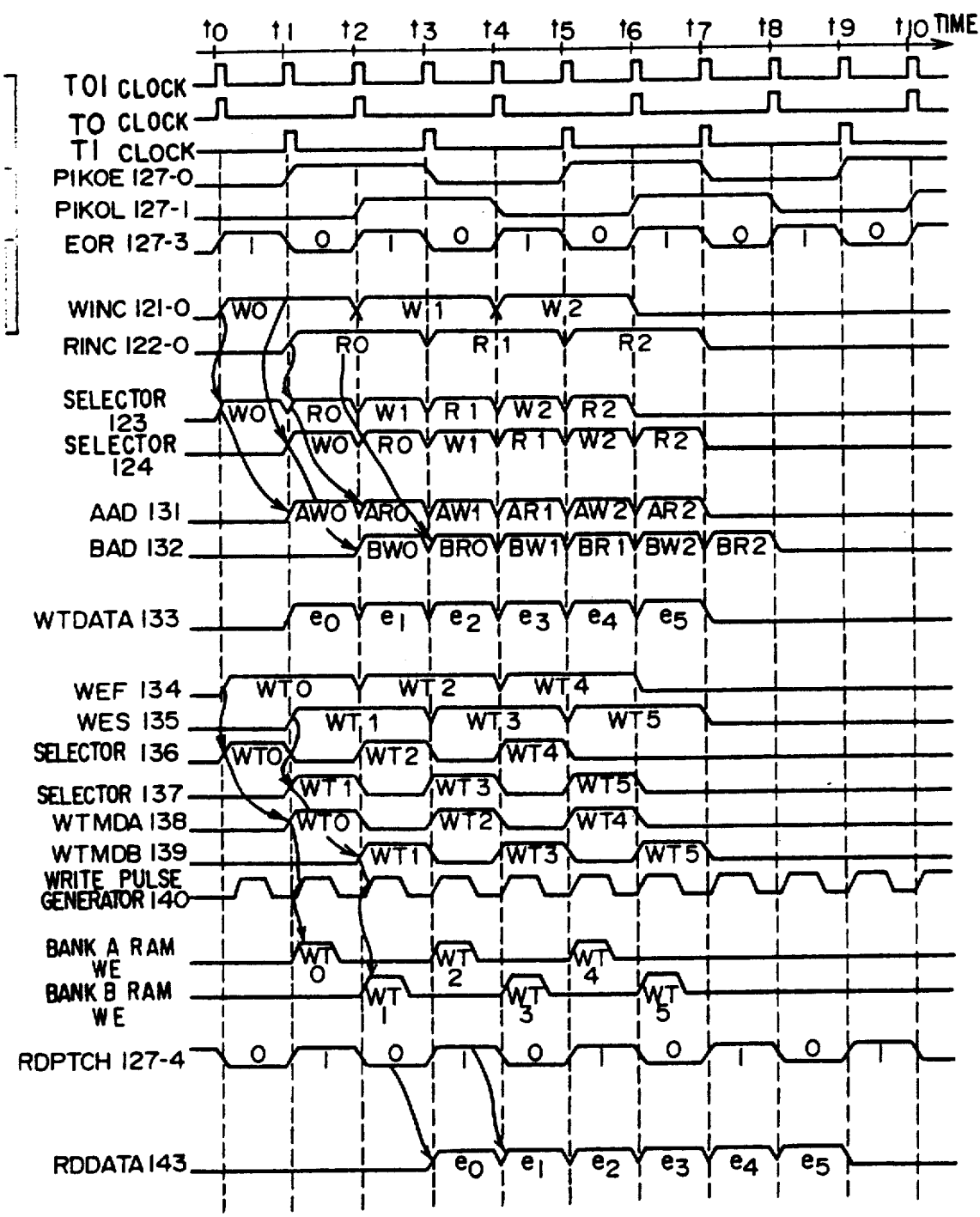
FIG. 6 is a timing chart useful to explain operations of the vector registers; and, FIG. 7 is a timing chart useful to explain operation of data in the vector register module.
Figure 7:
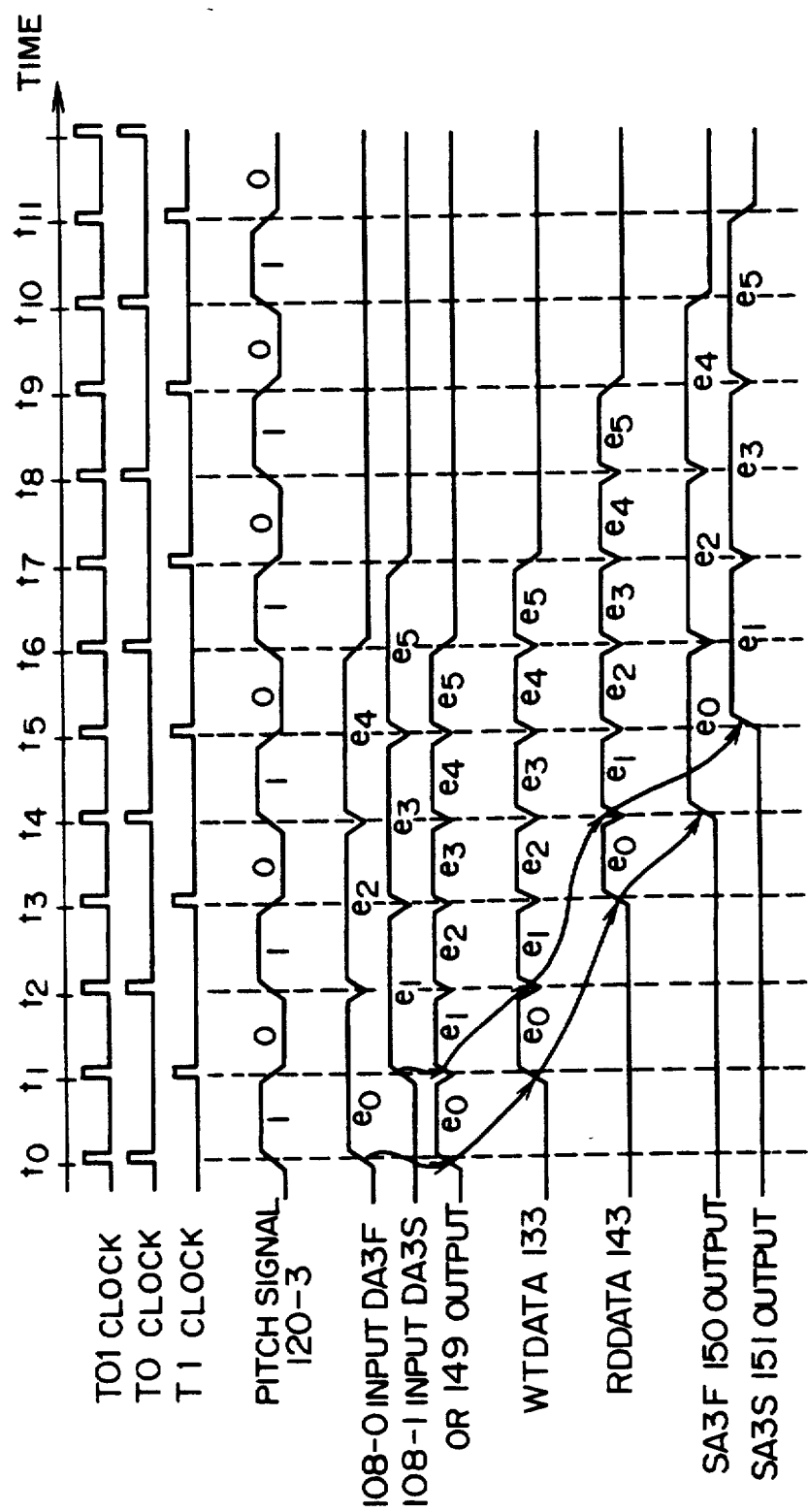

The outline of overall processing of the vector processor of FIG. 2 is similar to that of the vector processor of FIG. 1 and the JP-A-58-114274 described in conjunction with the conventional example, and hence description thereof will be omitted. In addition, the detailed structure of the vector registers 101 and the operations thereof are shown in FIGS. 3 and 6, respectively. The constitution and operations of the vector module (VR module) which includes the DIST 102, the vector registers 101, and the SEL 103 of the vector processor are shown in FIG. 4 and FIG. 7, respectively. Description of these elements will be given later.

Figure 5:
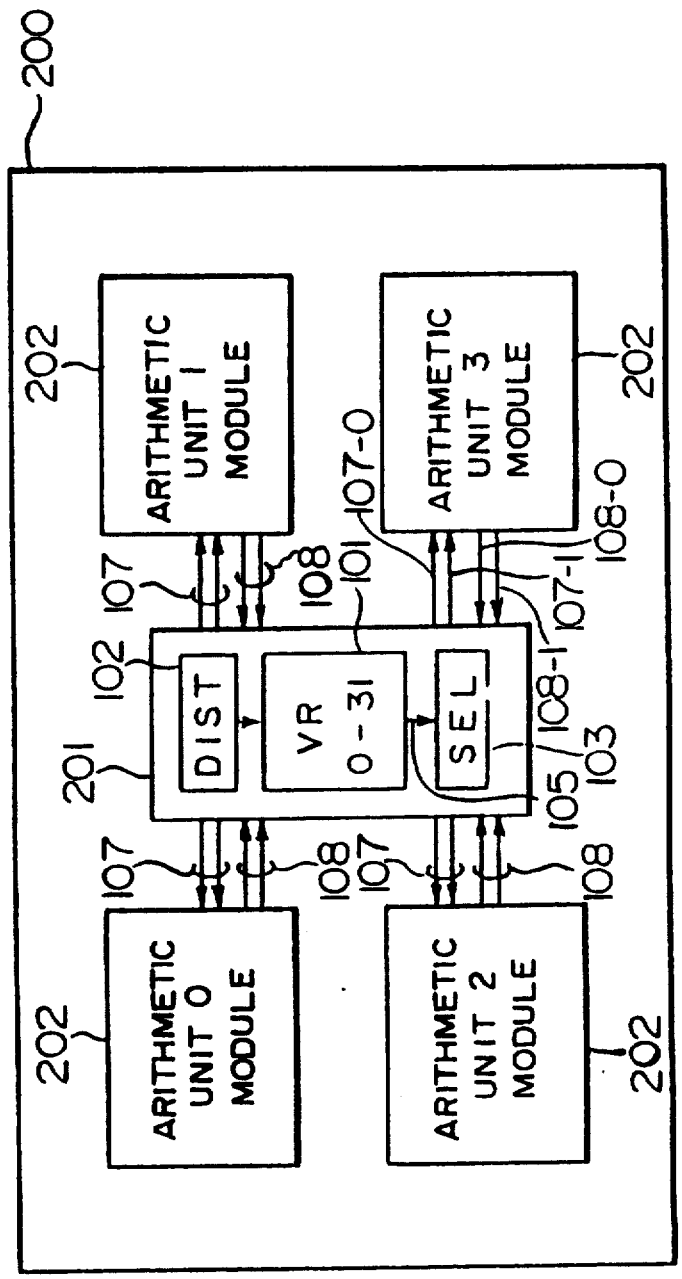
FIG. 5 is a configuration diagram showing a vector processor in a mounted state.

FIG. 5 is a schematic diagram showing the vector processor of FIG. 2 in the mounted state. In the structure of FIG. 5, the VR module 201 is logically constituted with a DIST 102, vector registers 101 including $VR_0$ to $VR_{31}$, and a SEL 103. Physically, DIST 102 and SEL 103 are implemented in a random-logic semiconductor chip including a super high speed RAM and random access logic. Although not shown in FIG. 5, the VR module 201 further includes a write control circuit 112 and a read control circuit 115. Four pipeline arithmetic units 106 are also configured with a plurality of semiconductor chips in the arithmetic unit modules 202. The arithmetic unit modules 202 and the VR module 201 are mounted on a vector processor card 200 by means of connecting pins. The vector load pipelines 110, the vector store pipelines 111, and the MS 109 are assumed to be mounted on another vector processor card and are not shown in FIG. 5. Of the vector data buses of FIG. 5, the write data bus 104 and the read data bus 105 are each driven at a clock speed which is twice the machine cycle for the physically closed VR module 201. The arithmetic result output buses 108, 108-0, 108-1 and the vector data input buses 107, 107-0, 107-1 are disposed to transmit signals through the connecting pins (to be passed two times) and the wirings on the vector processor card 200. By applying the mounting configuration of FIG. 5 to the vector processor of FIG. 2, the vector data signals driven at a clock speed as high as the machine cycle can be confined in a physically closed module. For the input/output operations, the signals having a clock speed of the machine cycle and a relationship of a phase difference identical to a half of the cycle are alternately switched or changed over. Unlike the conventional case it is not necessary to switch or change the signals at the connecting pin at a clock speed which is twice as high as the machine cycle. This provides electric stability at the connecting pin where impedance mismatching takes place.

Vector Register

FIG. 3 shows details about a vector register 101-0 constituting the 32 vector registers 101 including $VR_0$ to $VR_{31}$. In addition, FIG. 6 shows a signal timing chart for explaining the operation of the vector register 101-0.

(1) Clock

Three clocks T01, T0, and T1 are supplied to the vector register 101-0. In FIG. 6, the T01 clock is at a speed which is twice as high as the machine cycle, whereas the T0 and T1 clocks are as high as the machine cycle and there is a phase difference of a half of the cycle therebetween.

(2) Pitch control circuit 127

The pitch control circuit 127 includes a flip-flop PIKOE 127-0 driven by the T1 clock, a flip-flop PIKOL 127-1 driven by the T0 clock, an EOR gate 127-2 effecting a negation of an exclusive OR operation on the outputs from the two flip-flops 127-0 and 127-1, and a flip-flop RDPTCH 127-4 to which a signal 127-3 output from the EOR gate 127-2 is applied and which is driven by the T01 clock. A flip-flop 127-0 is via the PIKO signal line 144 supplied with a PIKO signal having a cycle which is twice the machine cycle also synchronized with the T1 clock. The output of the flip flop 127-0 is fed to the flip-flop PIKOL 127-1 synchronized with the T0 clock. As there is a phase difference equal to a half of machine cycle between the flip flop PIKOE 127-0 and the flip flop PIKOL 127-1, the outputs of the PIKOE 127-0 and the PIKOL 127-1 undergo a negation of exclusive OR, to produce a signal 127-3 which is synchronized with the T01 clock, and is shown as 127-3 in FIG. 6, so as to be "1" for the T0 clock and "0" for the T1 clock.

(3) WA counter 121

The WA counter 121 generates the RAM write address and is comprised of a flip-flop WINC 121-0 driven by the T0 clock and a 6-bit address register WAC 121-2 driven by the T0 clock. In addition, although not shown, the WA counter 121 is also configured to clear the address register WAC 121-2. In response to a write control signal 112 output from the write control circuit 113, the address data is incremented and is then set to the address register WAC 121-2. This data is output as WA counter address data 121-3.

(4) RA counter 122

The RA counter 122 generates a RAM read address. It includes a flip-flop RINC 122-0 driven by the T1 clock, a +1 circuit 122-1, and a 6-bit address register RAC 122-2 driven by the T1 clock. The RA counter 122 is also configured, though not shown, to clear the address register RAC 122-2. During operation, in response to a read control signal 116 output from the read control circuit 115, the address data is incremented and is then sent to the address register RAC 122-2. The data is then output as RA counter address data 122-3.

(5) Selector 123

The selector 123 which selects the address data of the bank A RAM 125 has its operation depicted in FIG. 6. When the pitch signal EOR 127-3 is "1" the WA counter address data 121-3 is selected. When the pitch signal EOR 127-3 is "0", the RA counter address data 122-3 is selected. The selector 123 output is supplied to a 6-bit bank A address register AAD 131 driven by the T01 clock and is then input as a bank A RAM address data signal 131-0 to the bank A RAM 125.

(6) Selector 124

The selector 124 which selects the address data of the bank B RAM 126 is depicted in FIG. 6. When the pitch signal EOR 127-3 is "0" the WA counter address data 127-3 is "1", the RA counter address data 122-3 is selected. The selector 123 output is supplied to a 6-bit bank B address register BAD 132 driven by the T01 clock and is then input as a bank B RAM address data signal 132-0 to the bank B RAM 126.

(7) Write data

The write data is supplied via the write data bus 104 and is then input to a register WTDATA 133 driven by the T01 clock. The write data is passed through an output DI bus 133-0 of the register WTDATA 133 to the bank A RAM 125 and the bank B RAM 126.

(8) WE control circuit

The Write Enable (WE) control circuit is disposed for each vector register !01 to enable the respective vector registers 101 to operate in a concurrent fashion according to an instruction. The constitution of the WE control circuit includes a flip-flop WEF 134 driven by the T0 clock, a flip-flop WES 135 driven by the T1 clock, a selector 136, a selector 137, a write mode flip-flop WTMDA 138 for the bank A RAM 126 and a write mode flip flop WTMDB 139 for the bank B RAM 126 each driven by the T01 clock, a write pulse generator 140 for delaying the rise time of the T01 clock pulse width thereby adjusting the RAMWE pulse width and the write hold time, and AND gates 141 and 142 to effect AND operations between the respective write modes and an output pulse from the write pulse generator 140. During the operation shown in FIG. 6, when the pitch signal EOR 127-3 is "1", the selector 136 selects the output from the flip-flop WEF 134; when EOR 127-3 is "0", the selector 137 selects the output from the flip-flop WES 135. For a write operation on the bank A RAM 125 containing all even-numbered elements of the vector data, the write control signal 113-0 is output. For a write operation on the bank B RAM 126 containing all odd-numbered elements of the vector data, the write control signal 113-1 is supplied.

(9) Read data

An output signal 127-5 from a flip-flop RDPTCH 127-4 of the pitch control circuit 127 controls the selector 128 which selects data output 125-0 from the bank A RAM 125 when the bank A address register AAD 131 indicates read address data. Selector 128 selects data output 126-0 from the bank B RAM 126 when the bank B address register BAD 132 indicates read address data. The selector 128 also delivers an output to the read data bus 105 through a data register RDDATA 143 driven by the T01 clock.

(10) Register RAM

Two super high speed RAMs are arranged such that the same vector data element is represented by the same address data. The bank A RAM 125 containing all even-numbered elements of the vector data is addressed by means of an output 131-0 from the bank A address register AAD 131. The bank B RAM 126 containing all odd-numbered elements of the vector data is addressed by means of an output 132-0 from the bank B address register BAD 132.

Referring to FIG. 6, the overall operation of the vector register 101-0 of FIG. 3 will be briefly described.

FIG. 6 shows a chaining processing in which a write operation and a read operation of vector data are simultaneously achieved on the vector register 101-0. Incidentally, it is assumed that the number of elements of the vector data is six and that the elements are arranged in an order of $e_0$, $e_1$, $e_2$, $e_3$, $e_4$, and $e_5$. First, for a write operation, at a time $t_0$ a flip-flop WINC 121-0 of the WA counter 121 is supplied with a clear signal W0 of the WA counter 121 The clear signal W0 is selected by the selector 123 for a period of time when the pitch signal EOR 127-3 is "1", the resultant signal has time width of $t_0$-$t_1$. This signal is input to the bank A address register AAD 131 such that an output therefrom is applied as an address signal AW0 to the bank A RAM 125 from the time $t_1$ to the time $t_2$. At the time $t_0$ for a write operation of the bank A RAM 125, a write signal WT0 is also input to the flip-flop WEF 134 so as to be selected by the selector 136 for a period of time where pitch signal EOR 127-3 is "1". The resultant signal with a time width of $t_0$-$t_1$ is input to the flip-flop WTMDA 138. Furthermore, for the output from the flip-flop WTMDA 138, the write signal WT0 is valid from the time $t_1$ to the time $t_2$ and is ANDed with an output pulse from the write pulse generator 140 in AND gate 141. This signal is applied as the WE signal to the bank A RAM 125 for the period of time $t_1$-$t_2$. The write vector data $e_0$ is input to the register WTDATA 133 at time $t_1$, and the output therefrom becomes valid in the time width of $t_1$-$t_2$. The first even-numbered element $e_0$ of the vector data is thus written in the bank A RAM 125 during the period of time $t_1$-$t_2$.

Next, on the bank B side, the clear signal W0 is selected by the selector 124 for the period of time when the pitch signal EOR 127-3 is "0" and the resultant signal of time width $t_1$-$t_2$ is input to the bank B address register BAD 132. This output is applied as an address signal BW0 to the bank B RAM 126 from the time $t_2$ to $t_3$. At time $t_1$ for a write operation on the bank B RAM 126, the write signal WT1 is input to the flip-flop WES 135 so as to be selected by the selector 137 while the pitch signal EOR 127-3 is "0". The resultant signal with time width of $t_1$-$t_2$ is supplied to the flip-flop WTMDB 139. The output from the flip-flop WTMDB 139 becomes valid from the time $t_2$ to the time $t_3$ and is ANDed with an output pulse from the write pulse generator 140 by means of an AND gate 142. This signal is applied as the WE signal to the bank B RAM 126 for the period of time $t_2$-$t_3$. The write vector data element $e_1$ is input to the register WTDATA 133 and the output therefrom becomes valid for the time width of $t_2$-$t_3$. The fist odd-numbered element $e_1$ of the vector data is written in the bank B RAM 126 for the period of time $t_2$-$t_1$. In a similar fashion for the write vector data elements $e_2$, $e_3$, $e_4$, $e_5$, the count-up signal W1 and W2 of the counter 121 are input to the flip-flop WINC 121-0 of the WA counter. This respectively produces addresses AW1 and AW2 of the bank A RAM 125 and addresses BW1 and BW2 of the bank B RAM 126. The signals WT2, WT3, WT4, and WT5 are the WE signals for the elements $e_2$, $e_3$, $e_4$, and $e_5$, respectively. Elements $e_2$, $e_3$, $e_4$, and $e_5$ are represented by $e_n$; WT2, WT3, WT4, and WT5 are expressed as WTn; and the time when $e_n$ is input to WTDATA 133 is denoted by $t_n$. Then, the vector data elements $e_2$, $e_3$, $e_4$, and $e_5$ can be written by setting the time when WTn is supplied to the flip-flops WEF 134 (n=2, 4,) and WES 135 (n=3, 5) to $t_n-1$.

For the read operation of vector data elements $e_0$, $e_1$, $e_2$, $e_3$, $e_4$, and $e_5$, the clear signal R0 of the RA counter 122 is issued to the flip-flop RINC 122-0 of the RA counter 122 at time $t_1$. The clear signal R0 is selected by the selector 123 while the pitch signal EOR 127-3 is "0" and is valid for the period of time $t_1$-$t_2$. It is input to the bank A address register AAD 131, and the output therefrom is applied as an address signal AR0 to the bank A RAM 125 from the time $t_2$ to the time $t_3$. When the output from the flip-flop RDPTCH 127-4 is "0", the selector 128 selects the data output 125-0 from the bank A RAM 125. Vector data element $e_0$ corresponding to the address AR0 is then applied to the bank A RAM 125 during the period of time $t_2$-$t_3$ at register RDDATA 143. An output therefrom is supplied to the data bus 105 from the time $t_3$ to the time $t_4$.

Next, on the bank B side, the clear signal R0 is selected by the selector 124 while the pitch signal EOR 127-3 is "1" and is valid for the period of time $t_2$-$t_3$. It is input to the bank B address register BAD 132, which then delivers the output as an address signal BR0 to the bank B RAM 126 from the time $t_3$ to the time $t_4$. The selector 128 selects the data output 126-0 from the bank B RAM 126 when the output from the flip-flop RDPTCH 127-4 is "1" and outputs the vector data $e_1$. Vector data $e_1$ corresponds to the address BR0 applied to the bank B RAM 126 for the period of time $t_3$-$t_4$ at the register RDDATA 143. The data is output to the read data bus 105 from the time $t_4$ to the time $t_5$. In a similar fashion, to read the vector data elements $e_2$, $e_3$, $e_4$, and $e_5$, the count-up signals R1 and R2 of the RA counter 122 are input to the flip-flop RINC 122-0 to respectively produce the addresses AR1 and AR2 of the bank A RAM 125 and the addresses BR1 and BR2 of the bank B RAM 126. The data is delivered via the data register RDDATA 143 to the read data bus 105 as shown in FIG. 6. The vector register 101-0 of FIG. 3 is thus capable of effecting a write operation and a read operation at the same time on the vector data at a rate which is twice as high as the machine cycle. This is accomplished by alternately writing in the bank A RAM 125 and the bank B RAM 126 at a rate which is twice the machine cycle. At the same time, the vector data can be alternately read from the bank A RAM 125 and the bank B RAM 126. These write and read operations are alternately effected in successive fashion.

VR module

FIG. 4 is a schematic configuration diagram of the components associated with the data processing in the VR module. FIG. 7 is a timing chart useful to explain the operation depicted in FIG. 4. The configuration of FIG. 4 includes a DIST 102, vector registers 101, and a SEL 103, which form the VR module of FIG. 5. DIST 102 is similar to that described above but provided in more detail. The pitch control circuit 120 is similar to the pitch control circuit 127 of the vector register 101-0 and comprises a flip-flop DPIKOE 120-0 driven by the T1 clock, a flip-flop DPIKOL 120-1 driven by the T0 clock, an EOR gate 120-2 effecting the negation of an EOR operation on the outputs from the flip-flops 120-0 and 120-1, and a pitch signal 120-3 output from the EOR gate 120-2. The operation of the pitch control circuit 120 is similar to that of the pitch control circuit 127. Registers 145 and 146 driven by the T0 clock are disposed on the input side of the selector 118 selecting the even-numbered elements of the vector data. Registers 147 and 148 driven by the T1 clock are disposed on the input side of the selector 119 selecting the odd-numbered elements of the vector data. Each set of the selectors 118 and 119 supply outputs to an OR gate 149. For SEL 103, a register 150 driven by the T0 clock is disposed on the output side of the selector 129 which selects the even-numbered elements of the vector data. Register 151 driven by the T1 clock is disposed on the output side of the selector 130 which selects the odd-numbered elements of the vector data. The register for the output bus 108-0 outputting the even-numbered operation result elements from the pipeline arithmetic units 106 of DIST 102 is designated as DA3F 145, the register for the output bus 108-1 outputting the odd-numbered operation result elements from the pipeline arithmetic units 106 is denoted as DA3S 147, the register for the even-numbered element bus 107-0 to the pipeline arithmetic unit 106 of the SEL 103 is indicated as SA3F 150, the register for the odd-numbered element bus 107-1 to the pipeline arithmetic unit 106 is indicated as SA3S 151, and the other register and buses are not shown in detail. FIG. 7 is a signal timing chart showing the operations of the chain processing in which the vector data elements $e_0$, $e_1$, $e_2$, $e_3$, $e_4$, and $e_5$ are processed between the VR module 201 of FIG. 4 and the pipeline arithmetic units 106. In FIG. 7, the first even-numbered element $e_0$ of the vector data is supplied from the pipeline arithmetic unit 106 via the bus 108-0 to the register DA3F 145 at the time $t_0$ and is valid for the period of time $t_0$–$t_2$. The element $e_0$ is input to the selector 118. The selector 118 selects the output from the register DA3F 145 while the pitch signal 120-3 is "1", so vector element $e_0$ is valid for the time width $t_0$–$t_1$. It is then output to the OR gate 149. The first odd-numbered element $e_0$ of the vector data is supplied via the bus 108-1 to the register DA3S 147 at the time $t_1$ and is valid for the time width $t_1$–$t_3$. It is then input to the selector 119. The selector 119 selects the output from the register DA3F 147 while the pitch signal 120-3 is "0", so vector element el is valid for the time width $t_1$–$t_2$ and is then output to the OR gate 149. In a similar fashion, the vector data elements $e_2$, $e_3$, $e_4$, and $e_5$ are subsequently processed so that the even-numbered and odd-numbered elements of the vector data sent to the VR module at the machine cycle rate are converted into a sequence of vector data elements. This results in a change or switching operation at a rate which is twice the machine cycle. The resultant vector data is input to the register WTDATA 133 of the vector register 101. Although the selectors 118 and 119 are neither shown nor described in conjunction with FIG. 7, it is assumed that a set of selectors will be chosen according to an instruction which selects the $VR_0$ of the vector register 101. The vector elements $e_0$, $e_1$, $e_2$, $e_3$, $e_4$, and $e_5$ are kept in the vector register 101 and are then read therefrom. In this regard, details of the operations are the same as those of the vector register 101-0 described above.

The vector data elements $e_0$, $e_1$, $e_2$, $e_3$, $e_4$, and $e_5$ output from the register RDDATA 143 each cause a change or switching operation at a rate which is twice the machine cycle. The registers SA3F 150 and SA3S 151 of SEL 103 are respectively driven by the T0 and T1 clocks. As shown in FIG. 7, the overall vector data is decomposed into the even-numbered elements and the odd-numbered elements of the vector data at the machine cycle rate. They are respectfully delivered via the buses 107-0 and 107-1 at a clock speed of the machine cycle with a phase difference equivalent to a half of the cycle therebetween.

In the logical configurations of DIST 102 and SEL 103 shown in FIG. 4, two vector data sequences each achieving a change-over operation at a machine cycle speed is converted into a vector data sequence at a speed which is twice the machine cycle. The resultant vector data sequence is input to the vector register. A vector data sequence switching at a speed which is twice the machine cycle is decomposed into two vector data sequences. The above configuration of vector register 101-0 in FIG. 3 occurs in a physically closed place having a small area of the VR module 201. The vector data signal effecting a change-over or switching operation at a rate twice the machine cycle are confined to the VR module 201. Confining the VR module to a small area makes electrical stability possible since a write data bus and a read data bus are disposed for each vector register. The number of hardware components can be minimized in the VR module. Since the signals are delivered at a clock speed equivalent to the machine cycle and with a phase difference of a half of the cycle, the input/output operations of the signals between the VR module 201 and the vector processor card are electrically stable. This ensures electrical noise caused by impedance mismatching will not occur.

An example in which vector data is subdivided into two vector element sequences transmitted at a basic machine cycle between modules of a physically closed system has been provided. The data is processed in the physically closed system at a speed which is twice the machine cycle. It is possible that vector data in a subdivided form comprising n sequences of vector elements can be transmitted between modules of a physically closed system with a phase difference of 1/n of the basic machine cycle between the respective sequences. This method permits data processing at a speed which is n times the basic machine cycle in the system. In a module having a RAM unit, the RAM unit is constituted with a RAM array including n RAMs of which each RAM is independently addressable and is capable of effecting the write and read operations at a speed which is n times the basic machine cycle. The n vector element sequences received by the module are converted into a vector element sequence at a speed which is n times the basic machine cycle. The vector elements are written into the respective RAMs and the vector elements are sequentially read from the respective RAMs at a speed which is n times the basic machine cycle. The elements are thus converted into n vector element sequences as described above.

Although the description has been given of a case where the vector register forms a module comprising RAMs, the module may be implemented by use of a component other than a vector register.

We claim:

1. A vector processing system in which a plurality of load/store pipelines from a plurality of arithmetic units and a main storage carry out input/output operations of vector data on a plurality of vector registers in parallel comprising:

a vector processor including a plurality of modules, each of said modules constituting a physically closed system, and vector data being received to each module and transmitted therefrom in a form of first and second groups of vector elements including first and second vector element sequences having a phase difference equal to a half of a period of a basic machine cycle from each other, at a speed of the basic machine cycle;

at least one of said modules functioning as vector registers, each of said vector registers including:

first and second input buffers driven with respective clocks of the basic machine cycle having a phase difference equal to a half of a period of the basic machine cycle from each other, and coupled to receive said first and second vector data element sequences of said vector data, respectively;

combining means coupled to said first and second input buffers, for combining the first and second vector element sequences into a vector data element sequence having a speed which is twice the basic machine cycle;

RAM arrays coupled to an output of said combining means, each RAM array operating at twice the speed of the basic machine cycle and being independently addressable;

means for writing the vector data elements of said vector data element sequence in said RAM arrays at twice the basic machine cycle speed;

read means coupled to outputs of said RAM arrays for reading vector data elements from said RAM arrays at a speed which is twice the basic machine cycle in an alternate fashion; and, first and second output buffers driven with respective clocks of the basic machine cycle having a phase difference equal to a half of a period of the basic machine cycle from each other, for converting said vector data element sequence into first and second vector data element sequences each having a speed of the basic machine cycle, and for outputting vector data of said first and second vector data element sequences stored, as outputs of said at least one module.

2. A vector processor according to claim 1 wherein said module having said RAM arrays includes vector registers.

3. A vector processor according to claim 1 wherein said vector elements are subdivided into a sequence of odd-numbered vector data elements and a sequence of even-numbered vector data elements.

4. A vector processor according to claim 1 wherein said means for writing and said read means operate at a speed equal to the basic machine cycle with a phase difference of one half of a period of the basic machine cycle therebetween.

5. A vector processor according to claim 1 wherein said means for writing generates a write instruction signal at a rate of the basic machine cycle and said read means generates a read instruction signal at a rate of the basic machine cycle.

6. A vector processor according to claim 5 wherein said write instruction signal is utilized by a write address counter and said read instruction signal is utilized by a read address counter.

7. A vector processor according to claim 6 wherein said write address counter generates a write address counter signal at a rate of the basic machine cycle which is input to one of said RAM arrays as an address signal at a beginning half period of the basic machine cycle and is input to an other of said RAM arrays as an address signal at a beginning of the next half period of the basic machine cycle.

* * * * *